United States Patent
Park

(10) Patent No.: US 6,263,217 B1
(45) Date of Patent: Jul. 17, 2001

(54) MOBILE TELEPHONE CAPABLE OF AUTOMATICALLY REBUILDING MENU TREE AND METHOD FOR CONTROLLING THE SAME

(75) Inventor: Hong-Ju Park, Seoul (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/223,162

(22) Filed: Dec. 30, 1998

(30) Foreign Application Priority Data

Dec. 31, 1997 (KR) .................................................. 97-80556

(51) Int. Cl.⁷ ...................................................... H04B 1/38
(52) U.S. Cl. ...................... 455/566; 455/158.4; 455/564; 379/88.11
(58) Field of Search .................................... 455/550, 566, 455/575, 90, 158.4; 379/88.11, 88.14, 387, 122; 345/352, 353, 146

(56) References Cited

U.S. PATENT DOCUMENTS

| 5,038,401 | * | 8/1991 | Inotsume | 455/92 |
| 5,432,902 | * | 7/1995 | Matsumoto | 395/338 |
| 5,666,502 | * | 9/1997 | Capps | 345/352 |
| 6,047,197 | * | 4/2000 | Jarrad | 455/566 |
| 6,061,576 | * | 5/2000 | Terrasson | 455/566 |

FOREIGN PATENT DOCUMENTS

| 6-152497 | * | 11/1992 | (JP) | H04B/7/26 |

* cited by examiner

Primary Examiner—Nay Maung
Assistant Examiner—Sonny Trinh
(74) Attorney, Agent, or Firm—Dilworth & Barrese, LLP

(57) ABSTRACT

A mobile telephone capable of automatically rebuilding a menu tree, including a display unit and a scroll key for scrolling the menu tree. The mobile telephone includes a nonvolatile memory for storing status information about respective menus in the menu tree, and a controller for setting frequently used menus as representative menus based on the status information stored in the nonvolatile memory, and displaying the frequently used menus on the display unit in preference to other menus. The nonvolatile memory has a counter field for storing usage information for the respective menus; a child menu number field for storing information as to how many child menus are included in the respective menus; and child menu ID number fields for storing IDs of the child menus.

2 Claims, 3 Drawing Sheets

| MENU ID | COUNTER | No OF CHILD MENUS | ID OF CHILD MENU #1 | ID OF CHILD MENU #2 | ID OF CHILD MENU #3 | ... | ID OF CHILD MENU #n |
|---|---|---|---|---|---|---|---|
| 0x1213 | 5 | 6 | 0x1224 | 0x1225 | 0x1226 | ... | 0x1229 |
| ... | | | | | | | |
| 0x1229 | 4 | 0 | 0x0000 | 0x0000 | ... | ... | 0x0000 |
| 0x0000 | 0 | 0 | 0x0000 | ... | ... | ... | 0x0000 |

MOBILE TELEPHONE CAPABLE OF AUTOMATICALLY REBUILDING MENU TREE AND METHOD FOR CONTROLLING THE SAME

BACKGROUND OF THE INVENTION

1. Field of the Invention

The present invention relates generally to a user interface of a mobile telephone, and more particularly, to a mobile telephone which automatically rebuilds a menu tree such that a user can quickly and easily access a frequently used menu.

2. Description of the Related Art

As mobile telephones have diminished in size, certain hardware features of the mobile telephone have been compromised. For instance, with smaller displays, the number of characters that can be displayed at once is limited. Similarly, smaller input devices render it more difficult for users to input data. Despite such hardware limitations, current mobile telephones have an abundance of functions, and the number of such functions is expected to grow in the future. Thus, advanced user interfaces have been developed for mobile telephones for enabling a user to easily access the various functions in the limited hardware environment. In practice, the mobile telephone builds the various functions into a menu tree. With this approach, the user may search for a desired function by scrolling the menu tree using a scroll key on a keypad.

FIG. 1 illustrates a typical menu tree of a mobile telephone. As illustrated, menus A, B and C are "child" menus of a "parent" menu entry P, and they have a sibling relationship. Likewise, menu A is also a parent of the sibling child menus A1, A2; menu B is a parent of menus B1, B2, B3, and so forth. It is possible to move from one sibling menu to another sibling menu by using the scroll key on the keypad. Each time the user moves the scroll key, the display unit displays a message representing a function of a corresponding menu. While scrolling the menus, if the user selects a specific parent menu by pressing a select key on the keypad, the display unit displays a representative child menu (i.e., the first child menu displayed) of the selected menu. For example, on the assumption that a menu B1 is a representative child menu of the menu B, if the user presses the select key when the display unit displays the menu B, the display unit will display the representative child menu B1. In this manner, the user can select a desired function.

One shortcoming of the conventional menu tree is that it is fixed as designed by the manufacturer. Thus, for example, if the user more frequently uses a particular child menu (e.g., menu B3) more than the representative child menu (B1), he/she will press the scroll key several times to access the target child menu B3, which amounts to excessive work for the user.

SUMMARY OF THE INVENTION

It is therefore an object of the present invention to provide a mobile telephone which automatically sets a most frequently used child menu so that a user may quickly and easily access the frequently used menu.

In an illustrative embodiment of the present invention, there is provided a mobile telephone capable of automatically rebuilding a menu tree. The mobile telephone includes a nonvolatile memory for storing status information about respective menus in the menu tree, and a controller for setting frequently used menus as representative menus based on the status information stored in the nonvolatile memory. The representative menus are displayed on a display unit of the mobile telephone in preference to other menus. The nonvolatile memory has a counter field for storing information as to how frequently the respective menus are used; a child menu number field for storing information as to how many child menus are included in the respective menus; and child menu identification (ID) number fields for storing IDs of the child menus.

An illustrative method in accordance with the invention for automatically rebuilding a menu tree in a mobile telephone is also presented. The mobile telephone includes a display unit, a select key, scroll-down and scroll-up keys, and a nonvolatile memory for storing information as to how frequently respective menus are used (with usage for respective menus being stored as counts), information as to how many child menus are included in the respective menus, and ID information for the child menus. The illustrative method includes the steps of: searching the nonvolatile memory for a child menu (of a present parent menu) that has a highest count value, setting that child menu as the present parent menu; then displaying the set parent menu on the display unit. Upon detection of a select key input, the nonvolatile memory is accessed to increase a count value for the set parent menu. Upon detection of a scroll-down key input, the nonvolatile memory is searched for one of plural sibling menus (of the set parent menu) that has a second highest count value, and that sibling menu is then set to the present parent menu. Further, upon detection of a scroll-up key input, the mobile telephone searches the nonvolatile memory for the sibling menu (of the set parent menu) having a count value higher than that of the set parent menu; this sibling menu is then set as the present parent menu.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described hereinbelow with reference to the accompanying drawings. In the following description, well known functions or configurations are not described in detail so as not to obscure the invention in unnecessary detail.

Figures 2, 3:
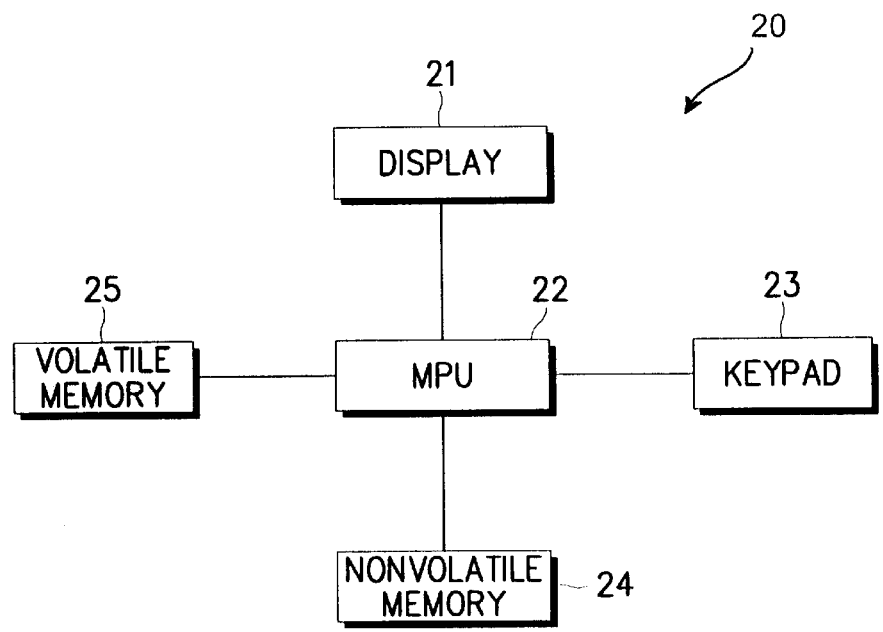
FIG. 2 is a schematic block diagram of a mobile telephone.
FIG. 3 is a memory map of a nonvolatile memory (24) shown in FIG. 2.

Referring now to FIG. 2, a schematic block diagram of certain components of a mobile telephone 20 is shown. Mobile telephone 20 includes a microprocessor unit (MPU) 22 which controls the overall operation of the mobile telephone according to a control program. A display unit 21, e.g., an LCD (Liquid Crystal Display), displays characters on its screen. A key input unit (keypad) 23 has a number of keys including a select key and a scroll key with which the user may input data and control commands. The scroll key may actually consist of two keys: a scroll-down key for scrolling the menu tree downward, and a scroll-up key for scrolling the menu tree upward. A nonvolatile memory 24, e.g., an Electrically Erasable and Programmable Read Only Memory (EEPROM), stores status information about the respective menus in the menu tree. The status information for a particular menu preferably includes at least count information representing how many times that menu has been selected to perform its associated function. A volatile memory 25 such as a Random Access Memory (RAM), stores various information to be used or generated during execution of the control program.

Figure 1:
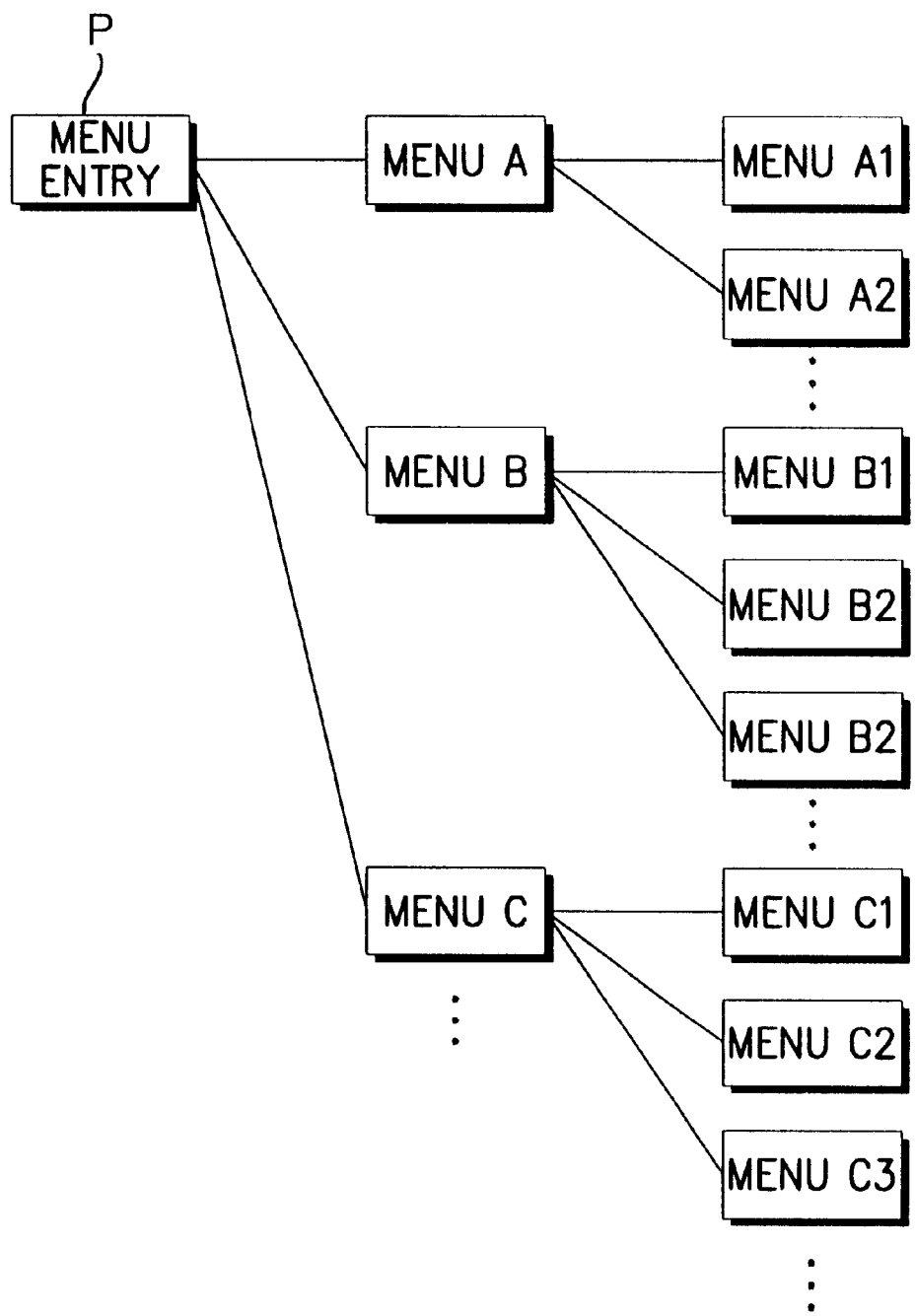
FIG. 1 is a diagram illustrating a typical menu tree of a mobile telephone.

FIG. 3 illustrates a memory map of the nonvolatile memory 24 where the status information of the respective menus is stored. A menu ID (identification) field stores unique IDs of parent/child menus such as menus A, B and C of FIG. 1. (These menus are designated here as parent/child menus since they have a root parent, P, as well as children of their own, i.e., A1, A2, . . . B1, B2, etc.) A counter field stores count information representing how often the respective menus A, B and C are used. A count value in the counter field increases by one each time the user presses the select key to select a respective menu A, B or C to perform an associated function of the selected menu or of one of its child menus. The maximum count value of the counter field can be either unlimited (to a degree) or set to a predetermined value by the manufacturer. A child menu number field stores information as to how many child menus are included in the respective menus A, B and C. Child menu #i (i=1–n) ID fields store unique IDs of the respective child menus corresponding to the parent menu in the same row. For instance, in the example shown in FIG. 3, if the menu ID field of 0×1213 represents menu B, the child menu ID field labeled 0×1224 may represent child menu B1; the field labeled 0×1226 may represent menu B2; and so on.

In the example of FIG. 3, the shown counter fields represent the counts for the exemplary parent/child menu A, B or C. In addition, count fields (not shown) are similarly provided for their respective child menus, such as A1, A2, B1, B2—these count fields represent how many times each of those menus has been used.

Figure 4:
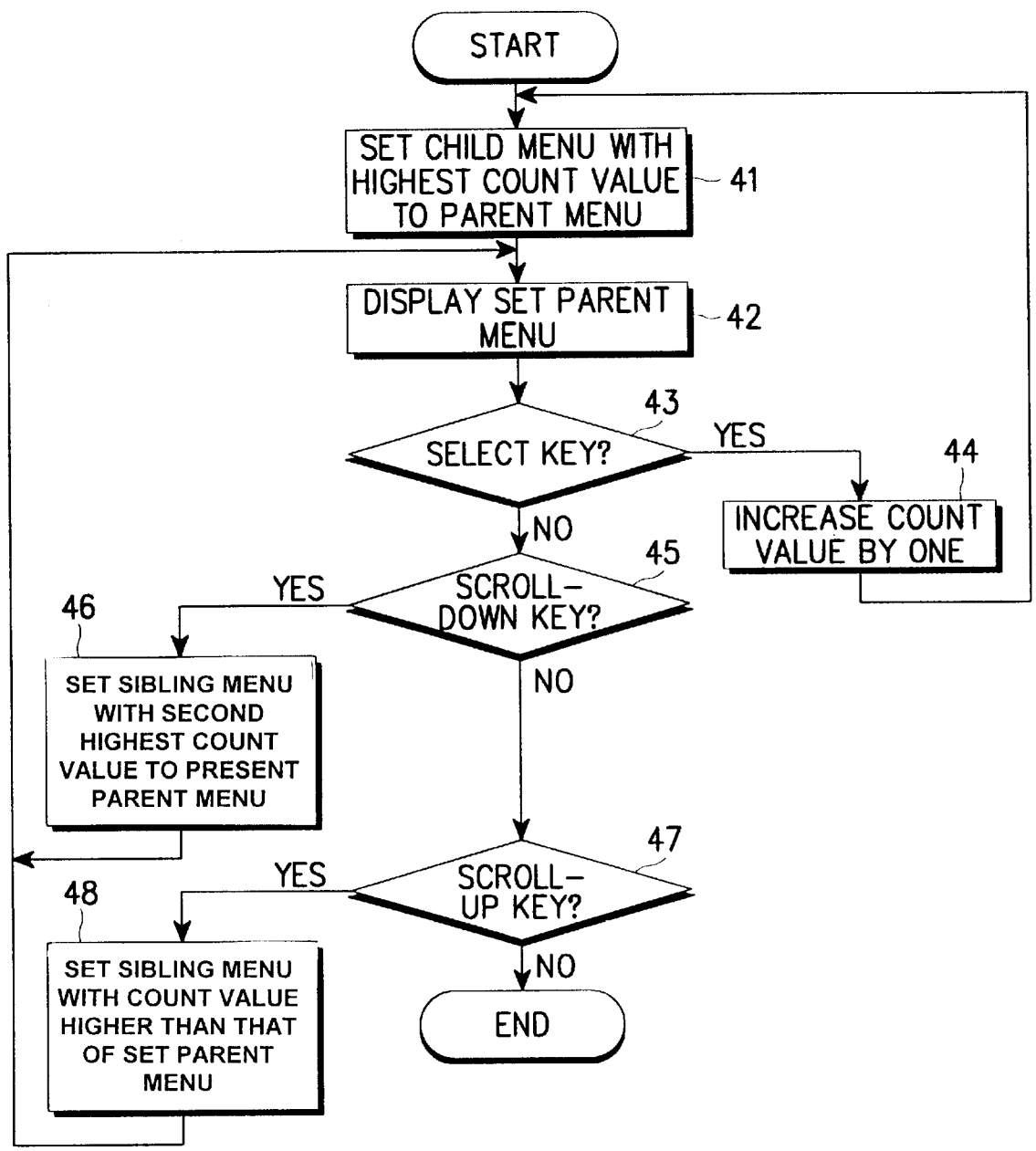
FIG. 4 is a flowchart illustrating a method for automatically rebuilding a menu tree in the mobile telephone according to an embodiment of the present invention.

FIG. 4 is a flowchart illustrating a method for automatically rebuilding a menu tree in the mobile telephone according to an embodiment of the present invention. By way of example to illustrate the method, it is assumed that among the menus A to C of the menu entry P (i.e., root menu P), menu B has the highest count value, menu A the second highest count value and menu C the lowest count value.

Referring collectively to FIGS. 1 through 4, MPU 22, which controls the menu operations, receives a present parent entry P and searches (in step 41) the nonvolatile memory 24 for the child menu among the child menus A to C (of the root menu entry) to determine which has the highest count value (most frequently used menu). In this example, that menu is menu B. MPU 22 then sets the searched child menu B as a present parent menu (which has child menus B1, B2, B3, . . . ). Thereafter, in step 42, MPU 22 displays the set parent menu B on the display unit 21 and runs the associated function. That is, through steps 41 and 42, MPU 22 sets the most frequently used child menu B to the representative child menu so that the user may easily access the most frequently used child menu B with a reduced number of key operations. Thus, instead of the display first displaying menu A, requiring the user to scroll down to its sibling menu B, the most frequently used menu B is displayed first, allowing one of its associated functions to be immediately carried out if the user so desires.

Subsequently, MPU 22 checks in step 43 whether or not a select key input is detected. When the select key input is detected, the MPU 22 accesses in step 44 the nonvolatile memory 24 to increase the count value of the counter field for the set parent menu B by one and then returns to step 41 to set the child menu (among menus B1 to B3) having the highest count value, to a representative child menu. This representative child menu (e.g., B2) is displayed first, in preference to its sibling child menus (B1, B3), to enable the user to again save time in accessing his/her most frequently used menu of the bunch.

If the select key input is not detected in step 43, the MPU 22 proceeds to step 45 to check whether a scroll-down key input is detected. If so, in step 45, MPU 22 searches the nonvolatile memory 24 for the sibling menu (of the set parent menu B) having the second highest count value, which is menu A in this example, and sets the searched sibling menu A as the present parent menu. If, however, the nonvolatile memory 24 does not have the corresponding menu (i.e., a menu having the count value lower than that of the presently set parent menu), in which case the lowest priority menu is reached, MPU 22 will maintain that lowest priority menu when the scroll down key input is detected.

When the scroll-down key input is not detected in step 45, the MPU 22 checks in step 47 whether a scroll-up key input is detected. If so, in step 48 MPU 22 searches the nonvolatile memory 24 for the sibling menu of the set parent menu that has a count value higher than that of the set parent menu, and then sets the searched sibling menu (i.e., with the higher count value), if any, as the present parent menu. However, since in this example the memory does not have a sibling menu with a count value higher than that of the presently set parent menu B, the MPU 22 sets the sibling menu (C) having the lowest count value as the parent menu. After steps 46 or 48, the procedure returns to step 42 to display the searched menu.

It is noted that some mobile telephones have the scroll-down key only. In this case, method steps 47 and 48 are unnecessary.

In the above-described embodiment, the menu tree is automatically rebuilt whenever the user accesses the menus. Therefore, the user can quickly and easily access the frequently used menus with a reduced number of key operations.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for automatically rebuilding a menu tree in a mobile telephone including a display unit, a select key, a scroll key, and a nonvolatile memory that stores menu usage information, the method comprising the steps of:

(a) searching the nonvolatile memory for a child menu having a highest usage count value out of plural child menus, wherein said plural child menus having a common present parent menu, and setting the searched child menu with the highest count value to a new present parent menu;

(b) displaying the set parent menu on the display unit;

(c) upon detection of a select key input, accessing the nonvolatile memory to increase a count value for the set parent menu;

(d) upon detection of a specific scroll key input, searching the nonvolatile memory for one of plural sibling menus of the set parent menu, which has a second highest usage count value, and setting the searched sibling menu as the present parent menu, and repeating step (b);

(e) upon detection of a second specific scroll key input, searching the nonvolatile memory for one of plural sibling menus of the present parent menu, which has a count value higher than that of the set parent menu, setting the searched sibling menu as the present parent menu and repeating step (b); and (f) setting a menu having the lowest count value to the present parent menu when the nonvolatile memory does not have a corresponding menu.

2. The method as claimed in claim 1, wherein a menu having the highest count value is set to the present parent menu when the nonvolatile memory does not have a corresponding menu in said step (d).

* * * * *